United States Patent
Suzuki et al.

(10) Patent No.: US 12,191,623 B2
(45) Date of Patent: Jan. 7, 2025

(54) LIGHT EMITTING SEALED BODY AND LIGHT SOURCE DEVICE

(71) Applicants: HAMAMATSU PHOTONICS K.K., Hamamatsu (JP); ENERGETIQ TECHNOLOGY, INC., Wilmington, MA (US)

(72) Inventors: Akio Suzuki, Hamamatsu (JP); Toru Fujita, Hamamatsu (JP); Akinori Asai, Hamamatsu (JP); Yusei Nagata, Hamamatsu (JP); Shinichi Ohba, Hamamatsu (JP); Takayuki Ohshiro, Hamamatsu (JP); Matthew Partlow, Somerville, MA (US); Ron Collins, Londonderry, NH (US); Stephen F. Horne, Medford, MA (US); Laura Owens, Arlington, MA (US)

(73) Assignees: Hamamatsu Photonics K.K. (JP); Energetiq Technology, Inc., Wilmington, MA (US)

( * ) Notice: Subject to any disclaimer, the term of this patent is extended or adjusted under 35 U.S.C. 154(b) by 0 days.

(21) Appl. No.: 18/520,272

(22) Filed: Nov. 27, 2023

(65) Prior Publication Data
US 2024/0097394 A1    Mar. 21, 2024

Related U.S. Application Data

(63) Continuation of application No. 17/129,750, filed on Dec. 21, 2020, now Pat. No. 11,862,922.

(51) Int. Cl.
*H01S 3/034* (2006.01)
*H01S 3/03* (2006.01)
(Continued)

(52) U.S. Cl.
CPC .............. *H01S 3/034* (2013.01); *H01S 3/038* (2013.01); *H01S 3/0385* (2013.01); *H01S 3/0305* (2013.01); *H01S 3/09716* (2013.01)

(58) Field of Classification Search
CPC ................. H01S 3/0326; H01S 3/0323; H01S 3/034–0346; H01J 61/302; H01J 65/04–042; H05G 2/008
See application file for complete search history.

(56) References Cited

U.S. PATENT DOCUMENTS

| 2,241,968 A | 5/1941 | Suits |
| 3,876,908 A * | 4/1975 | Chan .................... H05B 31/305 |
| | | 315/331 |

(Continued)

FOREIGN PATENT DOCUMENTS

| DE | 3222200 A1 * | 12/1983 | |
| DE | 4307316 A1 * | 9/1994 | ........... H01H 1/0203 |

(Continued)

OTHER PUBLICATIONS

Collins et al., "High Brightness Broadband Infrared Laser-Driven Light Source, from 0.3 to 20 Microns", A Hamamatsu Company, May 5, 2019.

(Continued)

*Primary Examiner* — Joshua King
(74) *Attorney, Agent, or Firm* — Cesari and McKenna, LLP

(57) ABSTRACT

A light emitting sealed body includes: a housing which stores a discharge gas and is provided with a first opening to which first light is incident along a first optical axis and a second opening from which second light is emitted along a second optical axis; a first window portion which hermetically seals the first opening; and a second window portion which hermetically seals the second opening. The housing is formed of a light shielding material which does not transmit (Continued)

the first light and the second light. An internal space is defined by the housing, the first window portion, and the second window portion and the internal space is filled with the discharge gas. The first opening and the second opening are disposed so that the first optical axis and the second optical axis intersect each other.

11 Claims, 13 Drawing Sheets

(51) Int. Cl.
*H01S 3/038* (2006.01)
*H01S 3/0971* (2006.01)

(56) References Cited

U.S. PATENT DOCUMENTS

| | | | | |
|---|---|---|---|---|
| 3,943,324 | A * | 3/1976 | Haggerty | C30B 13/24 423/625 |
| 4,179,037 | A * | 12/1979 | Chan | H01J 61/98 313/623 |
| 4,257,015 | A * | 3/1981 | Ljung | H01S 3/0385 372/87 |
| 4,376,328 | A * | 3/1983 | Mefferd | H01S 3/03 445/28 |
| 4,847,853 | A * | 7/1989 | Altman | H01S 3/09716 372/86 |
| 5,424,608 | A * | 6/1995 | Juengst | H01J 61/363 313/623 |
| 6,522,679 | B1 * | 2/2003 | Strowitzki | H01S 3/038 372/51 |
| 6,788,763 | B1 * | 9/2004 | Neff | H05G 2/003 378/34 |
| 7,435,982 | B2 | 10/2008 | Smith | |
| 7,619,232 | B2 * | 11/2009 | Schmidt | H05G 2/008 250/493.1 |
| 7,786,455 | B2 | 8/2010 | Smith | |
| 7,989,786 | B2 | 8/2011 | Smith et al. | |
| 8,309,943 | B2 | 11/2012 | Smith et al. | |
| 8,525,138 | B2 | 9/2013 | Smith et al. | |
| 8,921,814 | B2 * | 12/2014 | Pellemans | G03F 7/706847 250/493.1 |
| 9,048,000 | B2 | 1/2015 | Smith | |
| 8,969,841 | B2 | 3/2015 | Smith | |
| 9,185,786 | B2 | 11/2015 | Smith | |
| 9,357,626 | B2 | 5/2016 | Pellemans et al. | |
| 9,576,785 | B2 | 2/2017 | Blondia | |
| 9,609,732 | B2 | 3/2017 | Smith | |
| 9,646,816 | B2 | 5/2017 | Asai et al. | |
| 9,741,553 | B2 | 8/2017 | Blondia | |
| 9,748,086 | B2 | 8/2017 | Blondia | |
| 9,814,126 | B2 * | 11/2017 | Van Heumen | G03F 7/70575 |
| 9,824,879 | B2 | 11/2017 | Asai et al. | |
| 9,913,357 | B2 | 3/2018 | Van Heumen | |
| 9,922,814 | B2 | 3/2018 | Blondia | |
| 9,924,585 | B2 | 3/2018 | Van Heumen | |
| 9,934,927 | B1 | 4/2018 | Qazilbash et al. | |
| 9,984,865 | B2 | 5/2018 | Asai et al. | |
| 10,032,622 | B2 | 7/2018 | Asai et al. | |
| 10,057,973 | B2 | 8/2018 | Blondia | |
| 10,109,473 | B1 | 10/2018 | Blondia et al. | |
| 10,186,414 | B2 | 1/2019 | Blondia | |
| 10,186,416 | B2 | 1/2019 | Blondia | |
| 10,420,197 | B2 | 9/2019 | Van Heumen | |
| 10,504,714 | B2 | 12/2019 | Blondia | |
| 10,561,008 | B2 | 2/2020 | Mori et al. | |
| 10,609,804 | B2 * | 3/2020 | Mori | H01J 61/025 |
| 2001/0030986 | A1 * | 10/2001 | Bragin | H01S 3/036 372/55 |
| 2003/0147499 | A1 * | 8/2003 | Kondo | H05G 2/001 378/119 |
| 2004/0036393 | A1 * | 2/2004 | Eastlund | H01J 61/363 313/26 |
| 2004/0066827 | A1 * | 4/2004 | Steiger | H01S 3/038 372/87 |
| 2004/0114647 | A1 * | 6/2004 | Sukhman | H01S 3/03 372/36 |
| 2005/0047471 | A1 * | 3/2005 | Steiger | H01S 3/0388 372/87 |
| 2006/0222878 | A1 * | 10/2006 | Watanabe | H01J 61/366 428/34.4 |
| 2007/0090304 | A1 * | 4/2007 | Jonkers | H05G 2/003 250/504 R |
| 2007/0091972 | A1 * | 4/2007 | Steiger | H01S 3/09713 372/87 |
| 2007/0228300 | A1 * | 10/2007 | Smith | H01J 61/54 250/504 R |
| 2009/0032740 | A1 * | 2/2009 | Smith | H05G 2/001 250/503.1 |
| 2009/0067467 | A1 * | 3/2009 | Gutierrez | H01S 3/03 372/87 |
| 2010/0231129 | A1 * | 9/2010 | Moriyasu | H01J 9/266 228/124.6 |
| 2011/0181191 | A1 * | 7/2011 | Smith | B82Y 10/00 250/493.1 |
| 2011/0205529 | A1 * | 8/2011 | Gross | H01J 65/06 313/624 |
| 2012/0024250 | A1 * | 2/2012 | Weyl | F02C 7/264 123/143 B |
| 2012/0200216 | A1 * | 8/2012 | Okazaki | H01J 61/86 313/113 |
| 2013/0106275 | A1 * | 5/2013 | Chimmalgi | H01J 61/526 313/112 |
| 2013/0181595 | A1 * | 7/2013 | Bezel | H01J 61/125 313/112 |
| 2013/0329204 | A1 * | 12/2013 | Pellemans | H01J 61/545 315/111.21 |
| 2014/0239795 | A1 * | 8/2014 | Kim | H01J 61/86 313/111 |
| 2014/0367592 | A1 * | 12/2014 | Bezel | H01J 61/33 250/492.1 |
| 2015/0332908 | A1 * | 11/2015 | Blondia | H01J 61/547 313/111 |
| 2016/0004477 | A1 | 2/2016 | Antsiferov | |
| 2016/0044774 | A1 * | 2/2016 | Antsiferov | H01J 65/04 313/631 |
| 2016/0233079 | A1 * | 8/2016 | Asai | G03F 7/70025 |
| 2016/0029567 | A1 | 10/2016 | Teramoto | |
| 2016/0295674 | A1 | 10/2016 | Teramoto | H05G 2/008 |
| 2016/0316550 | A1 | 10/2016 | Van Heumen | H01J 61/54 |
| 2016/0336167 | A1 | 11/2016 | Blondia | H01J 61/30 |
| 2017/0040153 | A1 * | 2/2017 | Blondia | H01J 61/025 |
| 2017/0135192 | A1 * | 5/2017 | Blondia | H01J 61/54 |
| 2017/0278694 | A1 * | 9/2017 | Chuang | H01J 61/16 |
| 2018/0139830 | A1 | 5/2018 | Teramoto | H05G 2/00 |
| 2018/0191123 | A1 * | 7/2018 | Sintov | H01S 3/0315 |
| 2019/0021158 | A1 | 1/2019 | Nozaki | |
| 2019/0045615 | A1 | 2/2019 | Mori et al. | |
| 2019/0053364 | A1 | 2/2019 | Mori et al. | |

FOREIGN PATENT DOCUMENTS

| | | | | |
|---|---|---|---|---|
| DE | 3936946 | C2 * | 2/1995 | H01S 3/038 |
| DE | 102005007370 | B3 * | 9/2006 | H01J 61/28 |
| EP | 0807839 | B1 | 4/2003 | |
| JP | 02123775 | A * | 5/1990 | H01S 3/09716 |
| JP | 02288386 | A * | 11/1990 | H01S 3/038 |
| JP | 03165584 | A * | 7/1991 | H01S 3/038 |
| JP | 2006010675 | A | 1/2006 | |
| JP | 2006054064 | A * | 2/2006 | H01J 61/86 |
| JP | 2009070586 | A * | 4/2009 | |
| JP | 2010-205651 | A | 9/2010 | |
| JP | 2015084274 | A * | 4/2015 | H01J 65/04 |
| JP | 6211912 | | 6/2015 | |
| JP | 2016-201178 | A | 12/2016 | |
| JP | 2017-037802 | A | 2/2017 | |
| JP | 6224445 | | 11/2017 | |
| JP | 2017-220319 | | 12/2017 | |
| JP | 2018-060640 | | 4/2018 | |
| KR | 100430007 | B1 * | 5/2004 | |

(56) References Cited

FOREIGN PATENT DOCUMENTS

| WO | WO-2010086287 A1 | * | 8/2010 | ............ F02C 7/264 |
| WO | 2015/055387 A1 | | 4/2015 | |
| WO | WO-2016019723 A1 | | 2/2016 | |
| WO | WO-2017145662 A1 | * | 8/2017 | ............ H01J 61/025 |
| WO | WO-2017203791 A1 | * | 11/2017 | ............ H01J 65/04 |

OTHER PUBLICATIONS

Collins et al., "High Brightness Broadband Infrared Light Source, from 0.3 to 20 Microns", Energetiq Technology, Inc., Woburn, MA 01801, USA, May 5, 2019.

Mini-poster displayed at "Laser World of Photonics 2019" Jun. 24-27, 2019; Munich, Germany.

International Search Report for PCT/JP2021/035390, dated Dec. 14, 2021, 8 pages.

Wagner et al., "Ultrabroadband Nanospectroscopy with a Laser-Driven Plasma Source", ACS Photonics, Feb. 5, 2018, pp. 1467-1475.

"Supplementary Partial European Search Report," European Patent Office, Application No. 21909848.0-1211, Date of Mailing: Jun. 17, 2024, pp. 1-17.

\* cited by examiner

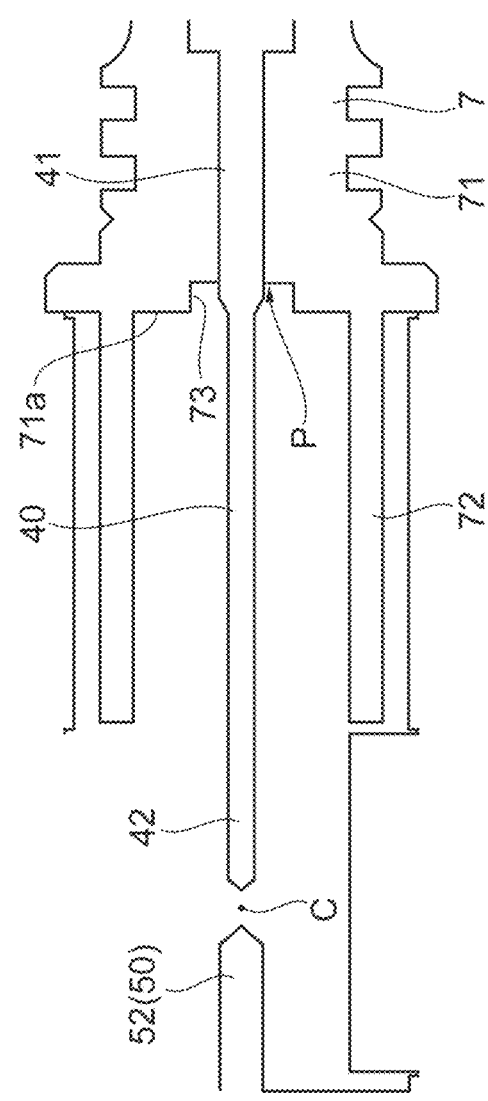
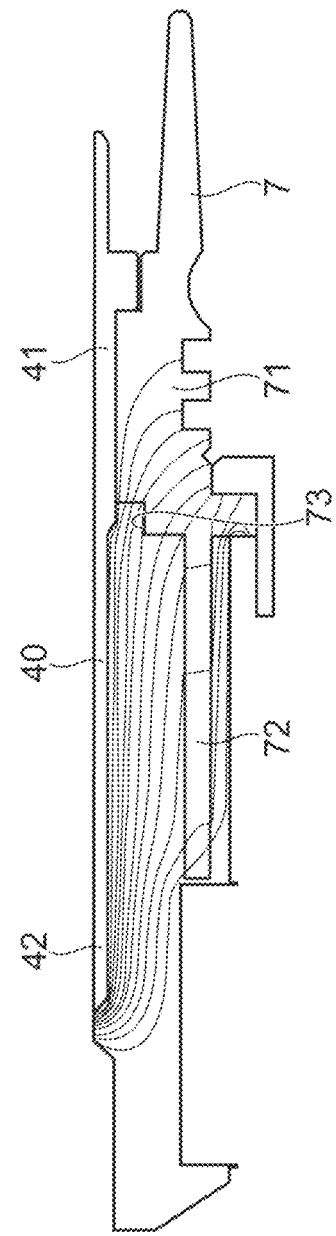
Fig.8A
Fig.8B

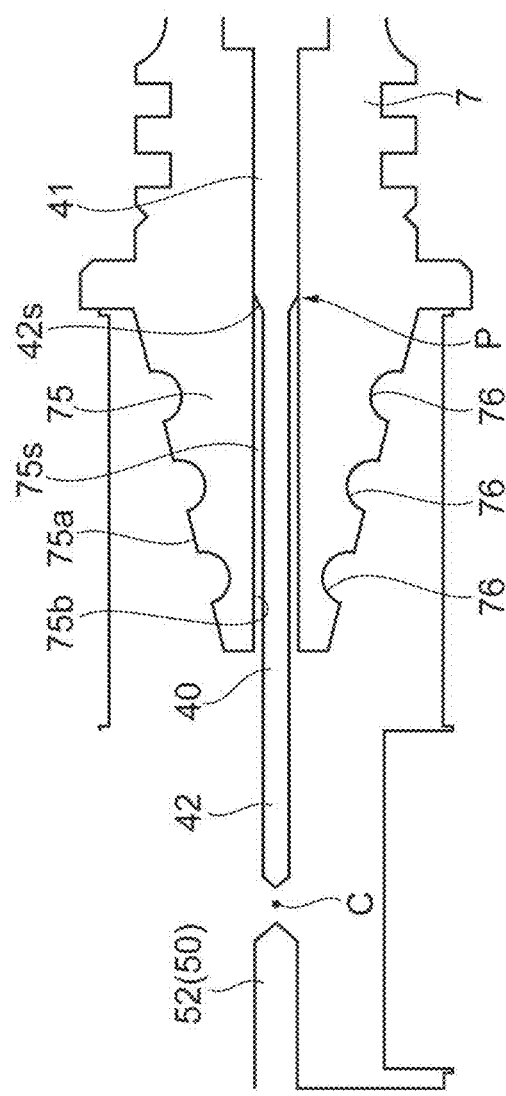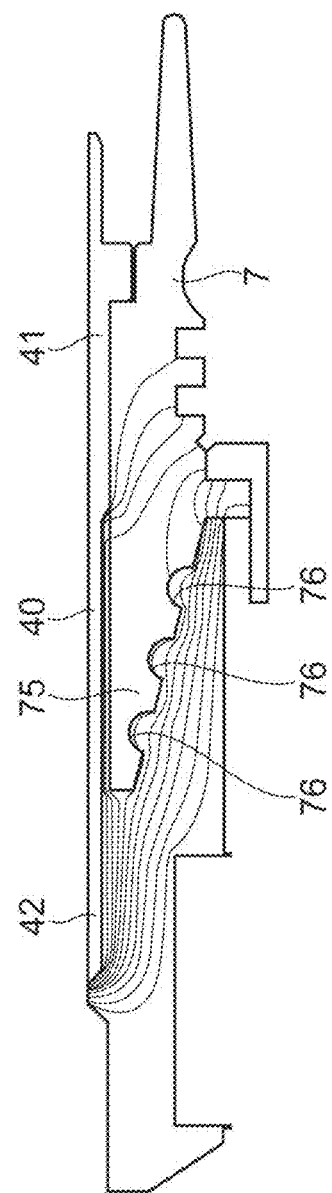
Fig.9A
Fig.9B

LIGHT EMITTING SEALED BODY AND LIGHT SOURCE DEVICE

CROSS-REFERENCE TO RELATED APPLICATIONS

The present application is a continuation of commonly assigned copending U.S. patent application Ser. No. 17/129,750, which was filed on Dec. 21, 2020, by Akio Suzuki et al. for LIGHT EMITTING SEALED BODY AND LIGHT SOURCE DEVICE, which is hereby incorporated by reference in its entirety.

BACKGROUND

Technical Field

An aspect of the present disclosure relates to a light emitting sealed body and a light source device.

Background Information

A laser excitation light source is known as a light source in which plasma generated in a discharge gas is maintained by the irradiation of laser light and light from the plasma is output as output light. A laser excitation light source described in U.S. Pat. No. 9,814,126 includes a first container storing a discharge gas and a second container storing the first container. The second container is provided with a light transmission window through which laser light is transmitted and a light transmission window through which output light is transmitted.

SUMMARY

In the above-described laser excitation light source, light loss is generated when the laser light and the output light are transmitted through the light transmission window and the first container. For that reason, there is room for improvement from the viewpoint of high efficiency and high output.

An object of an aspect of the present disclosure is to provide a light emitting sealed body and a light source device capable of achieving high efficiency and high output.

A light emitting sealed body according to an aspect of the present disclosure includes: a housing which stores a discharge gas and is provided with a first opening to which first light is incident along a first optical axis and a second opening from which second light is emitted along a second optical axis, in which the first light is laser light for maintaining plasma generated in the discharge gas and the second light is light from the plasma; a first window portion which hermetically seals the first opening and allows the first light to be transmitted therethrough; a second window portion which hermetically seals the second opening and allows the second light to be transmitted therethrough; and a first electrode and a second electrode which face each other with an intersection between the first optical axis and the second optical axis interposed therebetween, in which the housing is formed of a light shielding material which does not allow the first light and the second light to be transmitted therethrough, in which an internal space is defined by the housing, the first window portion, and the second window portion and the internal space is filled with the discharge gas, and in which the first opening and the second opening are disposed so that the first optical axis and the second optical axis intersect each other.

In the above-described light emitting sealed body, the first electrode and the second electrode are provided so as to face each other with the intersection between the first optical axis and the second optical axis interposed therebetween. Accordingly, plasma can be generated between the first electrode and the second electrode by applying a voltage between the first electrode and the second electrode. The housing is formed of the light shielding material that does not allow the first light and the second light to be transmitted therethrough. The internal space is defined by the housing, the first window portion, and the second window portion and the internal space is filled with the discharge gas. Accordingly, since the first light and the second light are not transmitted through a member other than the first window portion and the second window portion, light loss can be reduced. As a result, high efficiency and high output can be achieved.

The first window portion may include a first window member that allows the first light to be transmitted therethrough and the second window portion may include a second window member that allows the second light to be transmitted therethrough. In this case, it is possible to provide the window member in response to desirable properties for the first window portion and the second window portion.

The first window member and the second window member may be formed of the same material or different materials. In this case, an optimal material can be selected in response to a desired wavelength range.

Each of the first window member and the second window member may be formed in a flat plate shape. In this case, astigmatism can be suppressed.

Each of the first window member and the second window member may be formed of diamond, sapphire, quartz, Kovar glass, or magnesium fluoride. In this case, for example, light having a long wavelength in the infrared region can be transmitted through the first window member and the second window member.

The first window portion may further include a first frame member hermetically fixed to the housing and the second window portion may further include a second frame member hermetically fixed to the housing. Then, the first window member may be hermetically joined to the first frame member by a first joining material and the second window member may be hermetically joined to the second frame member by a second joining material. In this case, the first window member can be satisfactorily joined to the first frame member and the second window member can be satisfactorily joined to the second frame member.

Each of the first joining material and the second joining material may be a metal brazing material and be more desirably a titanium-doped silver brazing material. In this case, the light emitting sealed body of which a temperature of an internal space is hot due to plasma can be reliably maintained in a hermetic state.

The housing may be formed of a metal material. In this case, the enclosing pressure of the discharge gas can be further increased. Further, since the housing can be formed by machining, manufacturing tolerance can be reduced and manufacturing accuracy can be improved. The housing may be formed of an insulating material. In this case, components held by the housing can be easily electrically separated from each other.

The first electrode may be fixed to the housing through an insulation member and be electrically separated from the housing. In this case, a voltage can be applied to the first electrode.

The first electrode may extend in a predetermined direction and include a first portion corresponding to a part of the first electrode in the predetermined direction and a second portion located closer to the second electrode than the first portion. Then, the insulation member may include a main body portion which holds the first portion and has a surface extending along a plane perpendicular to the predetermined direction and a cylindrical portion which extends from the surface of the main body portion and surrounds the second portion. In this case, the voltage withstanding capability of the second portion is improved by the cylindrical portion and a discharge between the first electrode and the housing can be suppressed.

The surface of the main body portion may be roughened. In this case, the voltage withstanding capability of the surface portion of the main body portion can be improved.

A depression may be formed in the surface of the main body portion so as to be separated from each of the first electrode and the cylindrical portion. In this case, the generation of the unexpected discharge can be effectively suppressed.

A depression may be formed in the surface of the main body portion so as to contact the first electrode and to be separated from the cylindrical portion. In this case, the generation of the unexpected discharge can be effectively suppressed.

The first electrode may extend in a predetermined direction and the insulation member may include a covering portion which surrounds a part of the first electrode in the predetermined direction. In this case, a discharge between the first electrode and the housing can be suppressed by the covering portion.

The covering portion may have a shape in which a thickness becomes thinner as it goes toward the second electrode. In this case, an electric field can be smoothly formed from the first electrode to the insulation member and a discharge caused by the disturbance of the electric field can be suppressed.

An outer peripheral surface of the covering portion may be roughened. In this case, the voltage withstanding capability of the covering portion is improved and a creeping discharge in the covering portion can be suppressed.

The second electrode may be electrically connected to the housing. In this case, the second electrode can be set to a ground potential by the connection to the housing and a wiring for setting the ground potential can be omitted.

The first electrode may be fixed to the housing through a first insulation member and be electrically separated from the housing and the second electrode may be fixed to the housing through a second insulation member and be electrically separated from the housing. In this case, a voltage can be individually applied to the first electrode and the second electrode.

A light source device according to an aspect of the present disclosure includes the light emitting sealed body; and a light introduction unit which cause the first light to be incident to the first opening along the first optical axis. According to this light source device, high efficiency and high output can be achieved and the quality of the output light can be increased due to the above-described reasons.

According to an aspect of the present disclosure, it is possible to provide the light emitting sealed body and the light source device capable of achieving high efficiency and high output.

BRIEF DESCRIPTION OF THE DRAWINGS

The description below refers to the accompanying drawings, of which:

FIG. 8A is a partially enlarged view of a second modified example.

FIG. 8B is a diagram illustrating an example of an electric field distribution generated in the configuration of FIG. 8A.

FIG. 9A is a partially enlarged view of a third modified example.

FIG. 9B is a diagram illustrating an example of an electric field distribution generated in the configuration of FIG. 9A.

DETAILED DESCRIPTION

Figure 1:
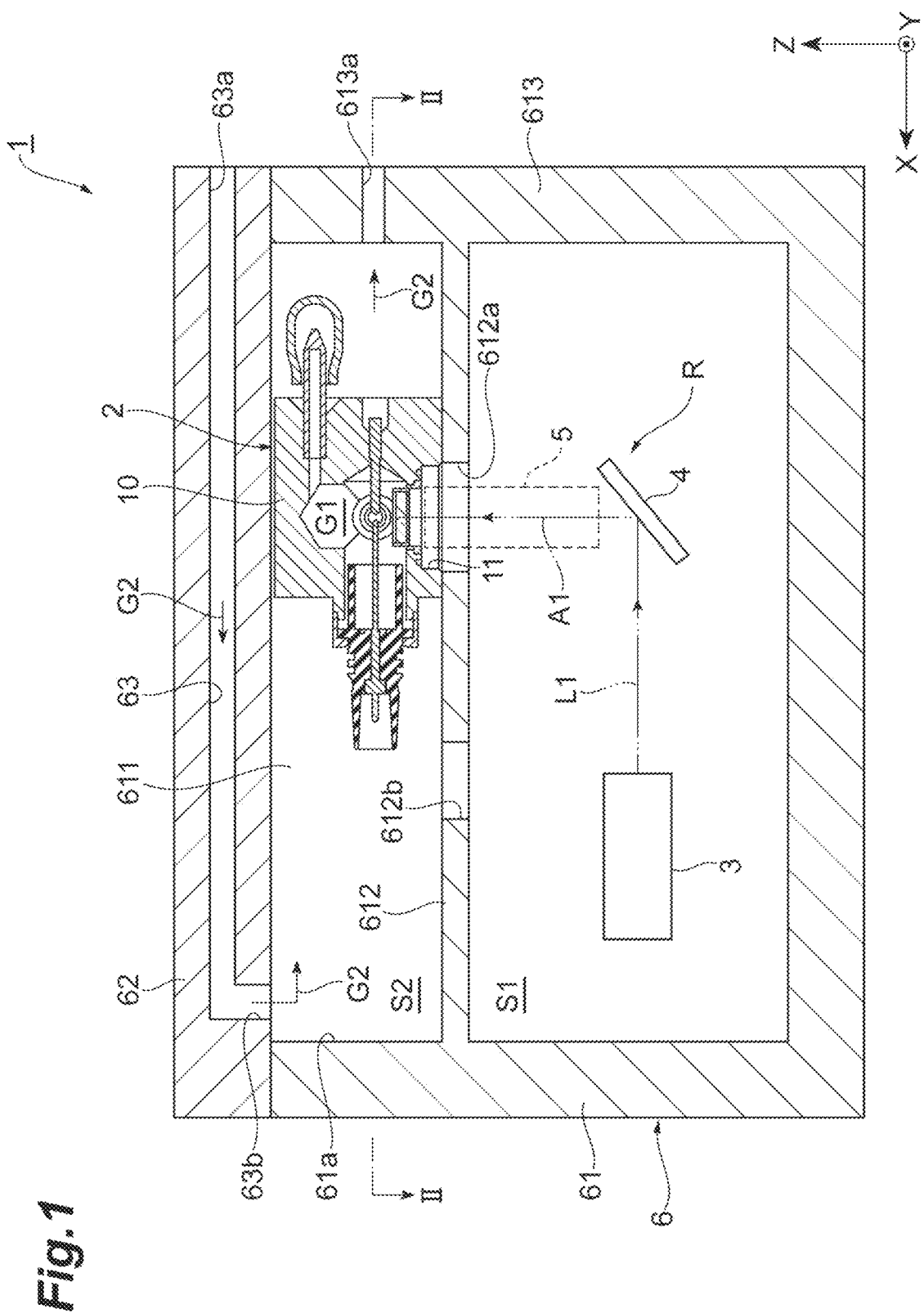
FIG. 1 is a cross-sectional view of a laser excitation light source according to an embodiment.
Figure 2:
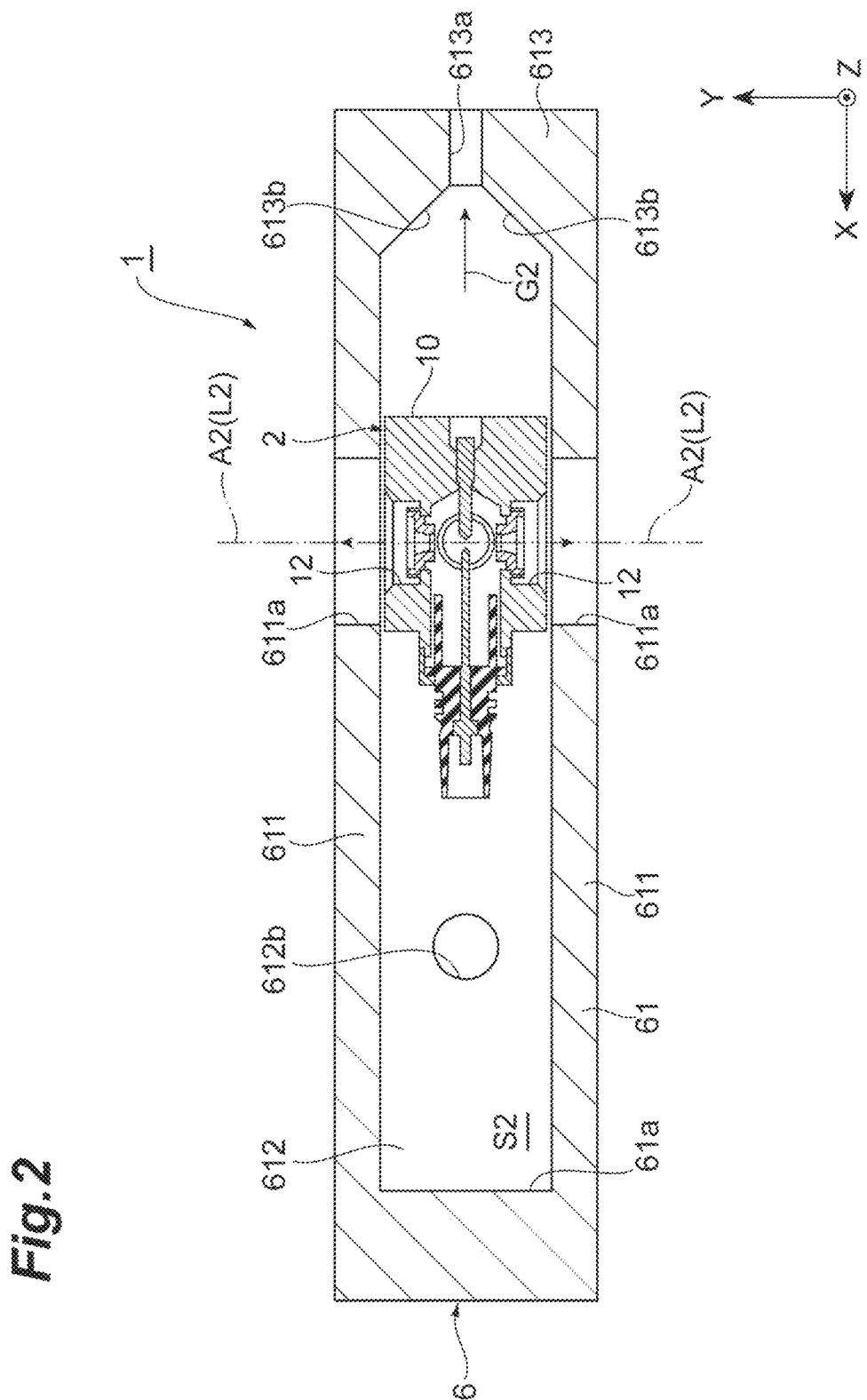
FIG. 2 is a cross-sectional view taken along line II-II of FIG. 1.
Figure 3:
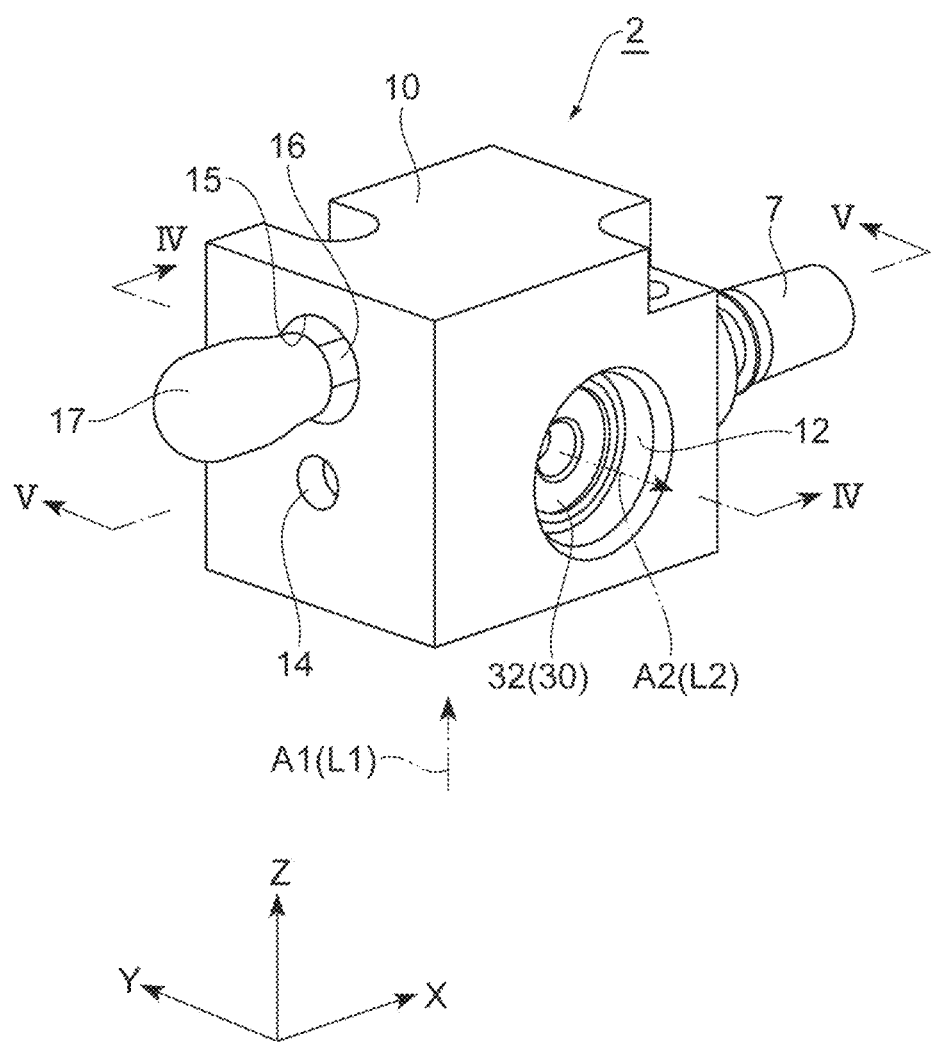
FIG. 3 is a perspective view of a light emitting sealed body according to an embodiment.

Hereinafter, an embodiment of the invention will be described in detail with reference to the drawings. Additionally, in the following description, the same or corresponding components will be denoted by the same reference symbols without redundant description.

[Configuration of Laser Excitation Light Source]

As illustrated in FIGS. 1 to 5, a laser excitation light source (light source device) 1 includes a light emitting sealed body 2, a laser light source 3, a mirror 4, an optical system 5, and a casing (lamp house) 6. The light emitting sealed body 2, the laser light source 3, the minor 4, and the optical system 5 are stored inside the casing 6. A discharge gas G1 is enclosed in the light emitting sealed body 2. The discharge gas G1 is, for example, a xenon gas. In the laser excitation light source 1, plasma is generated in the discharge gas G1. First light L1 which is laser light for maintaining plasma is incident to the light emitting sealed body 2 and second light L2 which is light from plasma is emitted from the light emitting sealed body 2 as output light. The first light has a wavelength of, for example, about 800 nm to 1100 nm. The second light L2 is, for example, light in the mid-infrared region and has a wavelength of about 2 μm to 20 μm. The light emitting sealed body 2 will be described in detail later.

The laser light source 3 is, for example, a laser diode and outputs the first light L1 which is laser light. The minor 4 reflects the first light L1 from the laser light source 3 toward the optical system 5. The optical system 5 includes one or plural lenses. The optical system 5 guides the first light L1 from the minor 4 to the light emitting sealed body 2 while condensing the first light L1. The laser light source 3, the mirror 4, and the optical system 5 constitute a light introduction unit R which causes the first light L1 to be incident to a first opening 11 along a first optical axis A1. The first opening 11 and the first optical axis A1 will be described later.

The casing 6 includes a main body portion 61 and a lid member 62. A storage space S1 is formed inside the main body portion 61 and the laser light source 3, the minor 4, and the optical system 5 are arranged inside the storage space S1. A depression 61a is formed in the main body portion 61 and an opening portion of the depression 61a is closed by the lid member 62 so as to form a storage space S2. The light emitting sealed body 2 is disposed inside the storage space S2. The main body portion 61 includes a pair of wall portions 611 which define the depression 61a and each wall portion 611 is provided with an opening 611a through which the second light L2 emitted from the light emitting sealed body 2 passes. The second light L2 passes through the opening 611a and is emitted to the outside.

The main body portion 61 includes a wall portion 612 which divides the storage space S1 and the depression 61a and the storage space S1 and the storage space S2 are divided by the wall portion 612. Further, an opening 612a is formed in the wall portion 612. A part of the optical system 5 is disposed inside the opening 612a and the first light L1 passes through the opening 612a and is incident to the light emitting sealed body 2.

A flow path 63 is formed inside the lid member 62. A gas G2 flows in the flow path 63. The gas G2 is, for example, an inert gas such as nitrogen. The flow path 63 is connected to the outside through an opening 63a and the gas G2 is supplied from an external gas supply device (not illustrated) to the flow path 63 through the opening 63a. The flow path 63 is connected to the storage space S2 of the main body portion 61 through an opening 63b and the gas G2 flows from the flow path 63 into the storage space S2 through the opening 63b.

The gas G2 passes between the wall portions 611 and 612 of the main body portion 61 and the light emitting sealed body 2 and/or between the lid member 62 and the light emitting sealed body 2 and is discharged from a ventilation hole 613a to the outside. The ventilation hole 613a is a through-hole which is formed in a wall portion 613 of the main body portion 61 so as to communicate with the storage space S2. The wall portion 613 includes a pair of tapered surfaces 613b which are respectively formed at the boundary portions of the pair of wall portions 611. The pair of tapered surfaces 613b are inclined so as to be closer to each other as it goes toward the ventilation hole 613a. Each tapered surface 613b is connected to the ventilation hole 613a. The tapered surface 613b guides the gas G2 toward the ventilation hole 613a. A through-hole 612b is formed in the wall portion 612 of the main body portion 61 and a part of the gas G2 flowing from the flow path 63 to the storage space S2 passes through the through-hole 612b and flows into the storage space S1.

[Configuration of Light Emitting Sealed Body]

The light emitting sealed body 2 includes a housing 10, a first window portion 20, two second window portions 30, a first electrode 40, and a second electrode 50.

The housing 10 is formed in a substantially box shape by a metal material and stores the discharge gas G1. More specifically, a sealed internal space S3 is formed inside the housing 10 and the internal space S3 is filled with the discharge gas G1. As an example of the metal material forming the housing 10, stainless steel is exemplified. In this case, the housing 10 has a light shielding property with respect to the first light L1 and the second light L2. That is, the housing 10 is formed of a light shielding material which does not allow the first light L1 and the second light L2 to be transmitted therethrough.

The first opening 11 and two second openings 12 are formed in the housing 10. The first light L1 is incident to the first opening 11 along the first optical axis A1. The first opening 11 is formed in a circular shape, for example, as viewed from a direction (hereinafter, referred to as a Z-axis direction) parallel to the first optical axis A1. In this example, the first optical axis A1 passes through the center of the first opening 11 as viewed from the Z-axis direction. The first opening 11 includes an inner portion 11a, a middle portion 11b, and an outer portion 11c. The inner portion 11a opens to the internal space S3. The outer portion 11c opens to the outside. The middle portion 11b is connected to the inner portion 11a and the outer portion 11c. Each of the inner portion 11a, the middle portion 11b, and the outer portion 11c has, for example, a cylindrical shape. The diameter (outer shape) of the middle portion 11b is larger than the diameter (outer shape) of the inner portion 11a and the diameter (outer shape) of the outer portion 11c is larger than the diameter (outer shape) of the middle portion 11b. A part of the optical system 5 is disposed in the outer portion 11c.

The second light L2 is emitted from each second opening 12 along a second optical axis A2. Each second opening 12 is formed in, for example, a circular shape as viewed from a direction (hereinafter, referred to as a Y-axis direction) parallel to the second optical axis A2. In this example, the second optical axis A2 passes through the center of the second opening 12 as viewed from the Y-axis direction. Each second opening 12 includes an inner portion 12a, a middle portion 12b, and an outer portion 12c. The inner portion 12a opens to the internal space S3. The outer portion 12c opens to the outside. The middle portion 12b is connected to the inner portion 12a and the outer portion 12c. Each of the inner portion 12a, the middle portion 12b, and the outer portion 12c has, for example, a cylindrical shape. The diameter (outer shape) of the middle portion 12b is larger than the diameter (outer shape) of the inner portion 12a and the diameter (outer shape) of the outer portion 12c is larger than the diameter (outer shape) of the middle portion 12b.

The first optical axis A1 intersects the second optical axis A2 inside the internal space S3. That is, the first opening 11 and the second opening 12 are disposed so that the first optical axis A1 and the second optical axis A2 intersect each other. An intersection C between the first optical axis A1 and the second optical axis A2 is located inside the internal space S3. In this example, the first optical axis A1 perpendicularly intersects the second optical axis A2, but the first optical axis A1 may intersect the second optical axis A2 at an angle other than a right angle. The first optical axis A1 is not parallel to the second optical axis A2. The first optical axis A1 does not pass through the second opening 12 and the second optical axis A2 does not pass through the first opening 11.

The first window portion 20 hermetically seals the first opening 11. The first window portion 20 includes a first window member 21 and a first frame member 22. The first window member 21 is formed in, for example, a circular flat plate shape by a translucent material that allows the first light L1 to be transmitted therethrough. In this example, the first window member 21 is formed of sapphire and allows light having a wavelength of 5 μm or less to be transmitted therethrough.

The first frame member 22 is formed in, for example, a frame shape by Kovar metal. The first frame member 22 is formed in a substantially cylindrical shape as a whole. The first frame member 22 includes a first portion 22a having a cylindrical shape and a second portion 22b having a cylindrical shape and integrally formed with the first portion 22a. The outer shape of the second portion 22b is larger than the outer shape of the first portion 22a.

The first window member 21 is disposed inside the first portion 22a. Specifically, a boundary portion between the inner surface of the first portion 22a and the inner surface of the second portion 22b is provided with a circular ring-shaped protrusion portion 22c which protrudes inward and the first window member 21 is disposed inside the first portion 22a while contacting the protrusion portion 22c. In this state, a side surface 21a of the first window member 21 contacts the inner surface of the first portion 22a.

The side surface 21a of the first window member 21 is hermetically joined to the inner surface of the first portion 22a over the entire circumference by a joining material (first joining material) 23. Accordingly, a gap between the first window member 21 and the first frame member 22 is hermetically sealed. The joining material 23 is, for example, a metal brazing material and is, more specifically, a titanium-doped silver brazing material. The titanium-doped silver brazing material is a brazing material composed of, for example, 70% of silver, 28% of copper, and 2% of Ti and is, for example, TB-608T manufactured by Tokyo Braze Co., Ltd.

An outer surface of the second portion 22b is provided with a circular ring-shaped flange portion 22d which protrudes outward. The first frame member 22 is fixed to the housing 10 while the flange portion 22d is disposed inside the middle portion 11b of the first opening 11. In this state, a part of the first portion 22a of the first frame member 22 protrudes from the first opening 11. The first window member 21 is disposed so as to face the intersection C between the first optical axis A1 and the second optical axis A2. In this example, the light incident surface and the light emitting surface of the first window member 21 are flat surfaces which extend so as to be perpendicular to the Z-axis direction.

Figure 4:
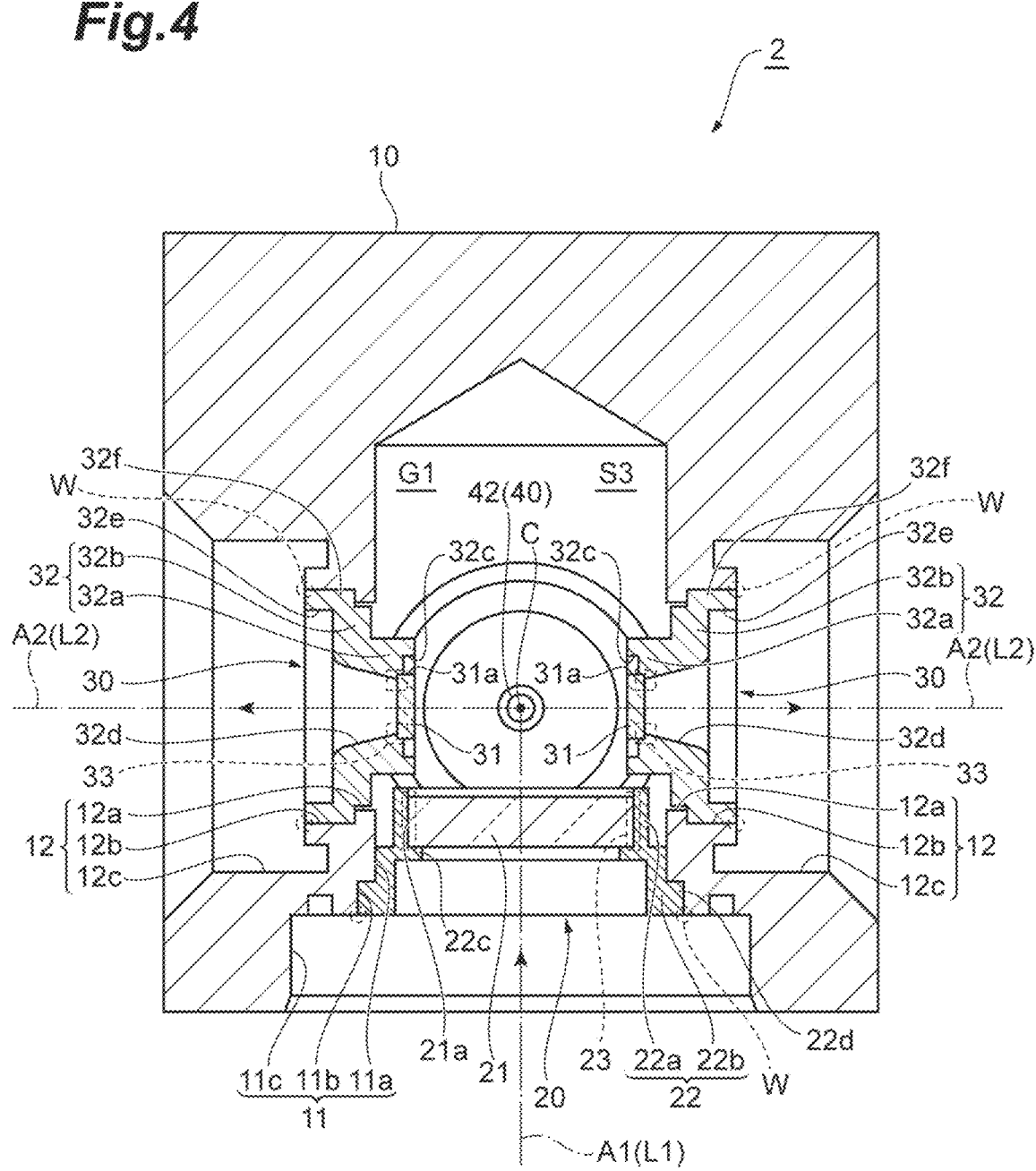
FIG. 4 is a cross-sectional view taken along line IV-IV of FIG. 3.
Figure 5:
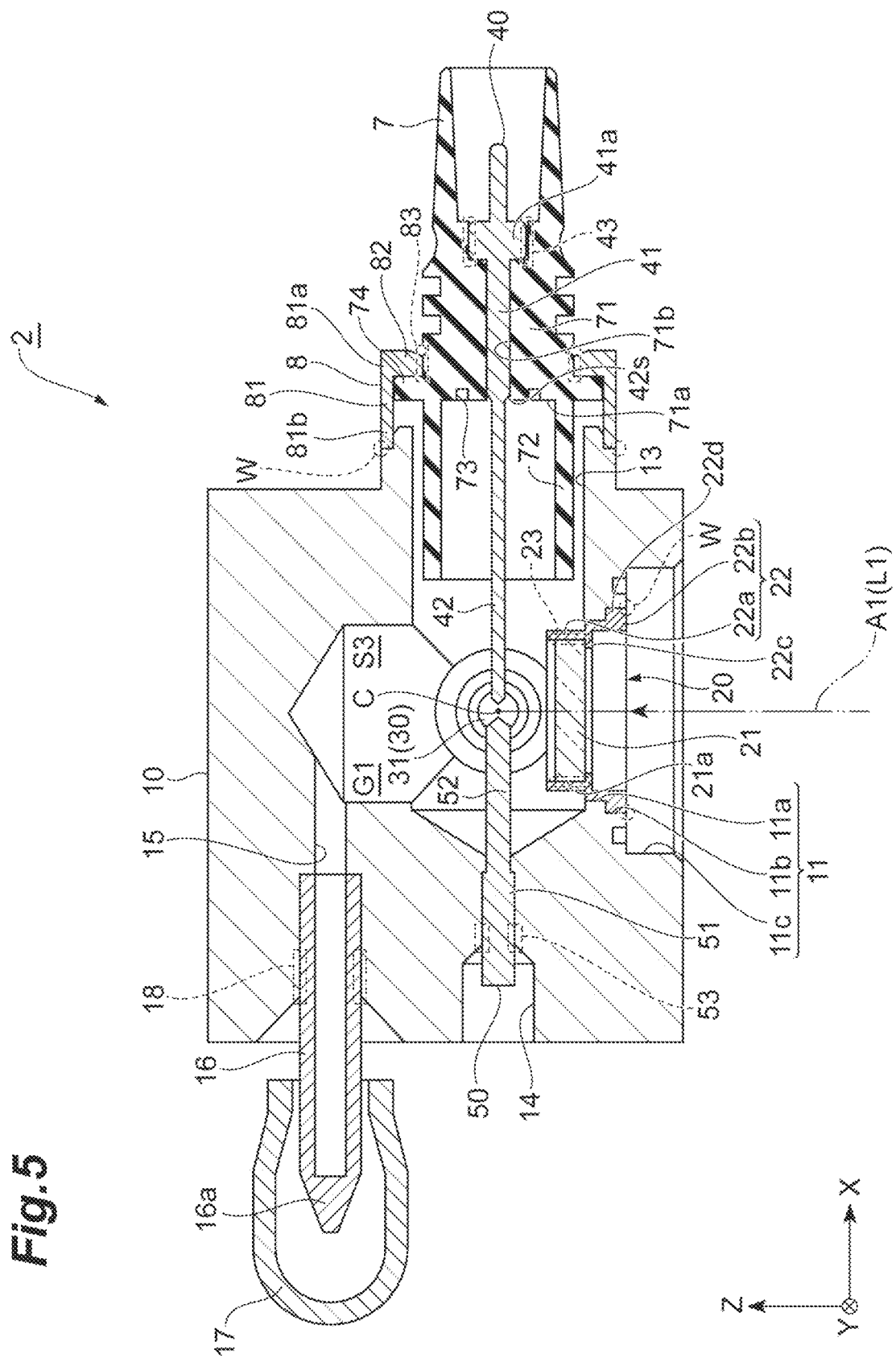
FIG. 5 is a cross-sectional view taken along line V-V of FIG. 3.

The first frame member 22 is hermetically fixed to the housing by laser welding. More specifically, a contact portion between the flange portion 22d and the inner surface of the middle portion 11b of the first opening 11 is irradiated with laser from the outside to be welded over the entire circumference, so that the first frame member 22 is hermetically joined to the housing 10. In FIGS. 4 and 5, a welded part is denoted by the sign W. Accordingly, a part between the first frame member 22 and the housing 10 is hermetically sealed. In this way, the first window member 21 is hermetically joined to the first frame member 22 by the joining material 23 and is hermetically fixed to the housing 10 via the first frame member 22. Since the first frame member 22 is interposed between the first window member 21 and the housing 10, problems caused by a difference in thermal expansion rate between the first window member 21 and the housing 10 can be suppressed.

Each second window portion 30 hermetically seals the second opening 12. Each second window portion 30 includes a second window member 31 and a second frame member 32. The second window member 31 is formed in, for example, a circular flat plate shape by a translucent material that allows the second light L2 to be transmitted therethrough. In this example, the second window member 31 is formed of diamond and allows light having a wavelength of 20 μm or less to be transmitted therethrough.

The second frame member 32 is formed in, for example, a frame shape by Kovar metal. The second frame member 32 is formed in a substantially cylindrical shape as a whole. The second frame member 32 includes a first portion 32a having a cylindrical shape and a second portion 32b having a cylindrical shape and integrally formed with the first portion 32a. The outer shape of the second portion 32b is larger than the outer shape of the first portion 32a.

The second window member 31 is disposed inside the first portion 32a. Specifically, the first portion 32a includes an arrangement portion 32c therein and the second window member 31 is disposed inside the arrangement portion 32c. In this state, a part on the side opposite to the intersection C in the side surface 31a of the second window member 31 contacts the inner surface of the first portion 32a. A space inside the second frame member 32 further includes a middle portion 32d connected to the arrangement portion 32c and an outer portion 32e connected to the middle portion 32d. The middle portion 32d has a truncated cone shape in which a diameter (outer shape) increases when going outward. The outer portion 32e is formed in a cylindrical shape having a diameter (outer shape) larger than the middle portion 32d.

The side surface 31a of the second window member 31 is hermetically joined to the inner surface of the first portion 32a over the entire circumference by a joining material (second joining material) 33. Accordingly, a part between the second window member 31 and the second frame member 32 is hermetically sealed. The joining material 33 is, for example, a metal brazing material and is, more specifically, a titanium-doped silver brazing material.

An outer surface of the second portion 32b is provided with a circular ring-shaped flange portion 32f which protrudes outward. The second frame member 32 is fixed to the housing 10 while the flange portion 32f is disposed inside the middle portion 12b of the second opening 12. In this state, a part of the first portion 32a of the second frame member 32 protrudes from the second opening 12. The second window member 31 is disposed so as to face the intersection C between the first optical axis A1 and the second optical axis A2. In this example, the light incident surface and the light emitting surface of the second window member 31 are flat surfaces which extend so as to be perpendicular to the Y-axis direction.

The second frame member 32 is hermetically fixed to the housing by laser welding. More specifically, a contact portion between the flange portion 32f and the inner surface of the middle portion 12b of the second opening 12 is irradiated with laser from the outside to be welded over the entire circumference, so that the second frame member 32 is hermetically joined to the housing 10. Accordingly, a part between the second frame member 32 and the housing 10 is hermetically sealed. In this way, the second window member 31 is hermetically joined to the second frame member 32 by the joining material 33 and is hermetically fixed to the housing 10 through the second frame member 32. Since the second frame member 32 is interposed between the second window member 31 and the housing 10, problems caused by a difference in thermal expansion rate between the second window member 31 and the housing 10 can be suppressed.

The first electrode 40 extends along an X-axis direction (predetermined direction) which is perpendicular to both the Y-axis direction and the Z-axis direction. The first electrode 40 faces the second electrode 50 with the intersection C between the first optical axis A1 and the second optical axis A2 interposed therebetween. A distance between the intersection C and a front end of the first electrode 40 in the X-axis direction is the same as a distance between the intersection C and a front end of the second electrode 50.

The first electrode 40 is formed of, for example, a metal material such as tungsten. The first electrode 40 is fixed to the housing 10 via a first insulation member 7 at the base end side thereof and is electrically separated from the housing 10. The first electrode 40 is formed in a substantially rod shape as a whole. The first electrode 40 includes a first support portion (first portion) 41 formed at a base end side and a first discharge portion (second portion) 42 located closer to the front end of the second electrode 50 than the first support portion 41. The first discharge portion 42 has a diameter smaller than that of the first support portion 41 and has a pointed shape. A boundary portion between the first support portion 41 and the first discharge portion 42 is provided with a tapered portion 42s. The tapered portion 42s has a surface which is inclined so that a diameter increases as it goes toward the first support portion 41. The tapered portion 42s is disposed at a positional relationship that forms a recess with respect to a surface 71a of a main body portion 71 to be described later. With such an arrangement of the tapered portion 42s, electrons E generated in a triple junction P to be described later can be caught in the recess. The first support portion 41 is a middle portion (a part) of the first electrode 40 in the X-axis direction. An end portion 41a at a base end side opposite to the first discharge portion 42 in the first support portion 41 is formed so as to be thicker than a portion other than the end portion 41a. The first discharge portion 42 is formed in a rod shape and is disposed inside the housing 10 (that is, inside the internal space S3).

The first insulation member 7 includes the main body portion 71 and a cylindrical portion 72. The first insulation member 7 is formed of, for example, an insulating material such as alumina (aluminum oxide) or ceramic. The main body portion 71 is formed in, for example, a columnar shape and holds the first support portion 41 of the first electrode 40. The main body portion 71 includes the surface 71a perpendicular to the X-axis direction. The surface 71a is a surface exposed to the internal space S3. The surface 71a is provided with an insertion hole 71b which penetrates the main body portion 71 in the X-axis direction and the first support portion 41 is disposed inside the insertion hole 71b and is fixed. The cylindrical portion 72 is formed in a cylindrical shape so as to extend along the X-axis direction from the surface 71a of the main body portion 71 and surrounds a part at the side (the base end side) of the first support portion 41 in the first discharge portion 42.

The end portion 41a of the first support portion 41 is hermetically joined to the inner surface of the insertion hole 71b over the entire circumference by a joining material 43. Accordingly, a gap between the first electrode 40 and the first insulation member 7 is hermetically sealed. The joining material 43 is, for example, a metal brazing material and is, more specifically, a titanium-doped silver brazing material.

The surface 71a of the main body portion 71 is roughened. In this embodiment, the surface 71a is roughened by forming a depression 73 in the surface 71a. The depression 73 extends in a circular ring shape so as to surround the first discharge portion 42 as viewed from the X-axis direction. The depression 73 is disposed so as to be separated from each of the first electrode 40 and the cylindrical portion 72. The shape of the depression 73 in a cross-section parallel to the X-axis direction is, for example, a rectangular shape.

The first insulation member 7 is hermetically fixed to the housing 10 via a connection member 8. An outer surface of the main body portion 71 of the first insulation member 7 is provided with a circular ring-shaped flange portion 74 which protrudes outward. The connection member 8 is formed of a metal material such as stainless steel. The connection member 8 includes a first portion 81 having a cylindrical shape and a second portion 82 having a ring-shaped flat plate shape and extending from a first end portion 81a of the first portion 81 inward in the radial direction. A front end of the second portion 82 contacts the outer surface of the main body portion 71. The flange portion 74 contacts the first portion 81 and the second portion 82.

The second portion 82 of the connection member 8 is hermetically joined to the outer surface of the main body portion 71 of the first insulation member 7 over the entire circumference by a joining material 83. Accordingly, a part between the connection member 8 and the first insulation member 7 is hermetically sealed. The joining material 83 is, for example, a metal brazing material and is, more specifically, a titanium-doped silver brazing material.

The connection member 8 is hermetically fixed to the housing 10 by laser welding. More specifically, a third opening 13 is formed in the housing 10. The cylindrical portion 72 of the first insulation member 7 is disposed inside the third opening 13 while being apart from the third opening 13. The connection member 8 is disposed so that a second end portion 81b of the first portion 81 contacts an opening edge of the third opening 13. A contact portion between the first portion 81 and the opening edge of the third opening 13 is irradiated with laser from the outside to be welded over the entire circumference, so that the connection member 8 is hermetically joined to the housing 10. Accordingly, a part between the connection member 8 and the housing 10 is hermetically sealed. In this way, the first insulation member 7 is hermetically joined to the connection member 8 and is hermetically fixed to the housing 10 via the connection member 8. In this state, the first electrode 40 extends so as to penetrate the third opening 13. The third opening 13 is hermetically sealed by the first electrode 40, the first insulation member 7, and the connection member 8. The connection member 8 can also be regarded as forming a part of the housing 10.

The second electrode 50 extends along the X-axis direction. The front end of the second electrode 50 faces the first electrode 40 with the intersection C between the first optical axis A1 and the second optical axis A2 interposed therebetween. The second electrode 50 is formed of, for example, a metal material such as tungsten. The second electrode 50 is electrically connected to the housing 10. The second electrode 50 is formed in a substantially rod shape having diameter larger than that of the first electrode 40 as a whole. The second electrode 50 includes a second support portion 51 formed at a base end side and a second discharge portion 52 located closer to the front end of the first electrode 40 than the second support portion 51 and having a pointed shape. The second support portion 51 is a middle portion (a part) of the second electrode 50 in the X-axis direction. The second discharge portion 52 is formed in a rod shape and is disposed inside the housing 10 (that is, inside the internal space S3).

A fourth opening 14 is formed in the housing 10. The second support portion 51 of the second electrode 50 is disposed inside the fourth opening 14 so that an outer surface of the second support portion 51 contacts the inner surface of the fourth opening 14. The second support portion 51 is hermetically joined to the inner surface of the fourth opening 14 over the entire circumference by a joining material 53. Accordingly, a part between the second electrode 50 and the housing 10 is hermetically sealed. The joining material 53 is, for example, a metal brazing material and is, more specifically, a titanium-doped silver brazing material.

The housing 10 is provided with an enclosing hole 15 for enclosing the discharge gas G1 in the internal space S3. An enclosing tube 16 is connected to the enclosing hole 15. The enclosing tube 16 is formed of, for example, a metal material such as copper. An end portion 16a opposite to the enclosing hole 15 in the enclosing tube 16 is sealed. A protection member 17 is attached to the enclosing tube 16 so as to cover the sealed end portion 16a. The protection member 17 is formed of, for example, a resin material such as rubber.

An outer surface of the enclosing tube 16 is joined to the inner surface of the enclosing hole 15 over the entire circumference by a joining material 18. Accordingly, a part between the enclosing tube 16 and the housing 10 is hermetically sealed. The joining material 18 is, for example, a metal brazing material and is, more specifically, a titanium-doped silver brazing material. When enclosing the discharge gas G1, for example, the discharge gas G1 is introduced into the internal space S3 through the enclosing tube 16 and the end portion 16a of the enclosing tube 16 is sealed by pressing and cutting (cutting out) the enclosing tube 16 while crushing the enclosing tube 16. Then, the protection member 17 is attached to the enclosing tube 16. Such a direct enclosing method is advantageous in the following points compared to a trap method using liquid nitrogen. That is, in the trap method, there is concern that the window member may be distorted when liquid nitrogen is placed in the light emitting sealed body. In the direct enclosing method, such a situation can be suppressed. Further, a variation in enclosing pressure may be generated in the trap method, but such a variation can be suppressed in the direct enclosing method. The trap method may be used when enclosing the discharge gas in a glass bulb.

In the light emitting sealed body 2, the internal space S3 is defined by the housing 10, the first window portion 20, and the second window portion 30. In the light emitting sealed body 2, the internal space S3 is also defined by the first electrode 40, the second electrode 50, the first insulation member 7, the connection member 8, and the enclosing tube 16. The entire internal space S3 is filled with the discharge gas G1. That is, the internal space S3 is filled with the discharge gas G1. The discharge gas G1 contacts the first window member 21, the first frame member 22, the second window member 31, and the second frame member 32. The enclosing pressure (the maximal enclosing pressure) of the discharge gas G1 is, for example, about 5 MPa (50 atm). The light emitting sealed body 2 can withstand an internal pressure of 15 MPa or more.

[Operation Example of Laser Excitation Light Source]

In the laser excitation light source 1, a negative voltage pulse is applied to the first electrode 40 by a voltage application circuit (a voltage application unit) (not illustrated) disposed inside the casing 6 using the second electrode 50 as a ground potential. Accordingly, electrons are discharged from the first electrode 40 toward the second electrode 50. As a result, an arc discharge is generated and plasma is generated in a gap (intersection C) between the first electrode 40 and the second electrode 50. This plasma is irradiated with the first light L1 from the light introduction unit R through the first window member 21. Accordingly, the generated plasma is maintained. The second light L2 which is the light from the plasma is emitted as the output light to the outside through the second window member 31. In the laser excitation light source 1, the second light L2 emitted from two second window members 31 toward both sides of the Y-axis direction. A positive voltage pulse which is a trigger voltage for generating plasma may be applied to the first electrode 40. In this case, electrons are discharged from the second electrode 50 toward the first electrode 40.

[Function and Effect]

In the light emitting sealed body 2, the first electrode 40 and the second electrode 50 are provided so as to face each other with the intersection C between the first optical axis A1 and the second optical axis A2 interposed therebetween. Accordingly, plasma can be generated between the first electrode 40 and the second electrode 50 by applying a voltage between the first electrode 40 and the second electrode 50. The housing 10 is formed of a light shielding material which does not allow the first light L1 and the second light L2 to be transmitted therethrough. The internal space S3 is defined by the housing 10, the first window portion 20, and the second window portion 30 and the internal space S3 is filled with the discharge gas G1. Accordingly, since a material having a relatively high strength such as a metal material can be selected as the light shielding material, the enclosing pressure of the discharge gas G1 can be increased. As a result, high efficiency and high output can be achieved. Further, since the first light L1 and the second light L2 are not transmitted through a member other than the first window portion 20 and the second window portion 30, the loss of light can be reduced. Also by this, high efficiency and high output can be achieved. Further, the first opening 11 and the second opening 12 are disposed so that the first optical axis A1 and the second optical axis A2 intersect each other. Accordingly, since it is possible to suppress the first light L1 from being emitted from the second opening 12 to be mixed with the second light L2, the quality of the output light can be increased. Thus, according to the light emitting sealed body 2, high efficiency and high output can be achieved and the quality of the output light can be increased.

The first window member 21 is formed of sapphire and the second window member 31 is formed of diamond. Accordingly, for example, light having a long wavelength in the infrared region can be transmitted through the first window member 21 and the second window member 31.

Each of the first window member 21 and the second window member 31 is formed in a flat plate shape. Accordingly, astigmatism can be suppressed. For example, in a light emitting sealed body in which a pair of electrodes are disposed inside a glass housing having a curved surface, astigmatism is generated when laser light and output light are transmitted through the curved surface, but in the light emitting sealed body 2, generation of such astigmatism can be suppressed.

The first window member 21 is hermetically joined to the first frame member 22 by a titanium-doped silver brazing material and the second window member 31 is hermetically joined to the second frame member 32 by a titanium-doped silver brazing material. Accordingly, the first window member 21 can be satisfactorily joined to the first frame member 22 and the second window member 31 can be satisfactorily joined to the second frame member 32. More specifically, the present inventors have found that a silver brazing material is repelled and unfamiliar in a configuration in which a window member formed of diamond is joined to a frame member formed of Kovar metal by a silver brazing material not doped with titanium. The present inventors have found that a silver brazing material becomes familiar when the window member is joined to the frame member using a titanium-doped silver brazing material and the window member can be satisfactorily joined to the frame member.

The housing 10 is formed of a metal material. Accordingly, the enclosing pressure of the discharge gas G1 can be further increased. Further, since the housing 10 can be formed by machining, manufacturing tolerance can be reduced and manufacturing accuracy can be improved.

The second electrode 50 is electrically connected to the housing 10. Accordingly, the second electrode 50 can be set to a ground potential by the connection to the housing 10 and the wiring for setting the ground potential can be omitted.

The first electrode 40 is fixed to the housing 10 through the first insulation member 7 and is electrically separated from the housing 10. Accordingly, a voltage can be applied to the first electrode 40.

The first insulation member 7 includes the main body portion 71 which holds the first support portion 41 of the first electrode 40 and the depression 73 is formed in the surface 71a of the main body portion 71. As the enclosing pressure of the discharge gas G1 becomes higher, a discharge starting voltage becomes higher according to Paschen's law. For that reason, the voltage applied between the first electrode 40 and the second electrode 50 needs to be large. On the other hand, there is concern that an unexpected discharge may be generated inside the housing 10 due to electrons generated in the vicinity of the triple junction in which the discharge gas G1, the first insulation member 7, and the first electrode 40 are in contact with each other when the applied voltage is large. Regarding this point, in the light emitting sealed body 2, the depression 73 is formed in the surface 71a of the main body portion 71 of the first insulation member 7. Accordingly, it is possible to suppress that electrons generated in the triple junction move along the surface 71a and reach the cylindrical portion 72 and to suppress the generation of the unexpected discharge.

Figure 6A:
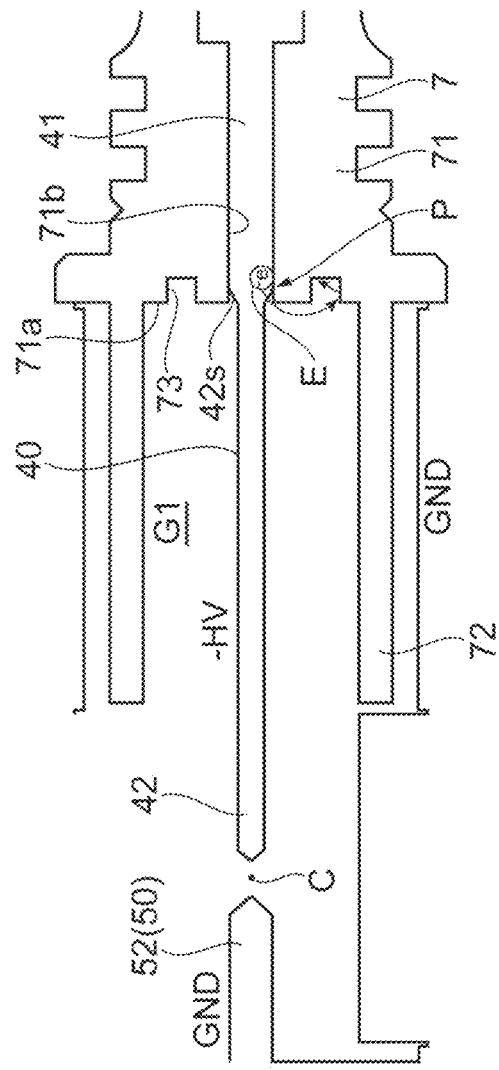
FIG. 6A is a partially enlarged view of FIG. 5.
Figure 6B:
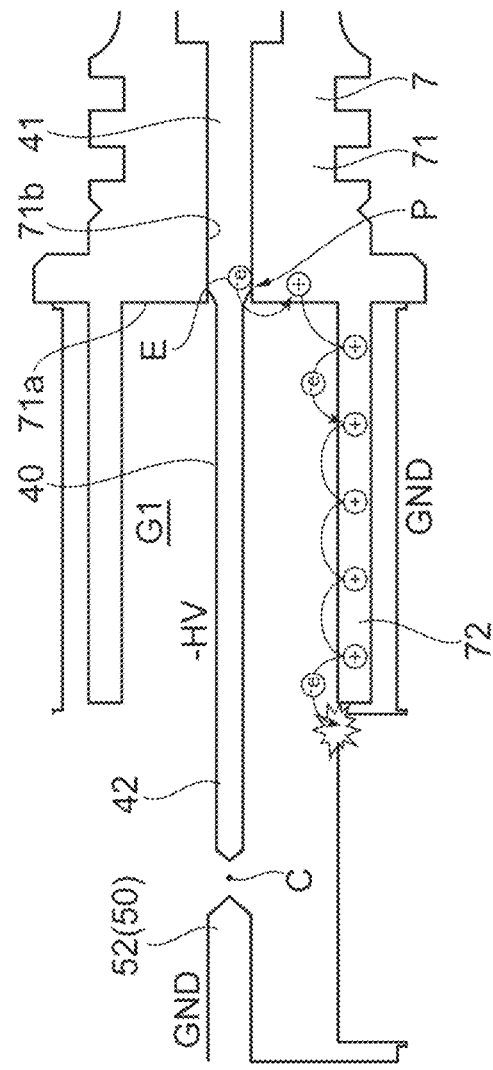
FIG. 6B is a partially enlarged view of a first modified example.
Figure 7A:
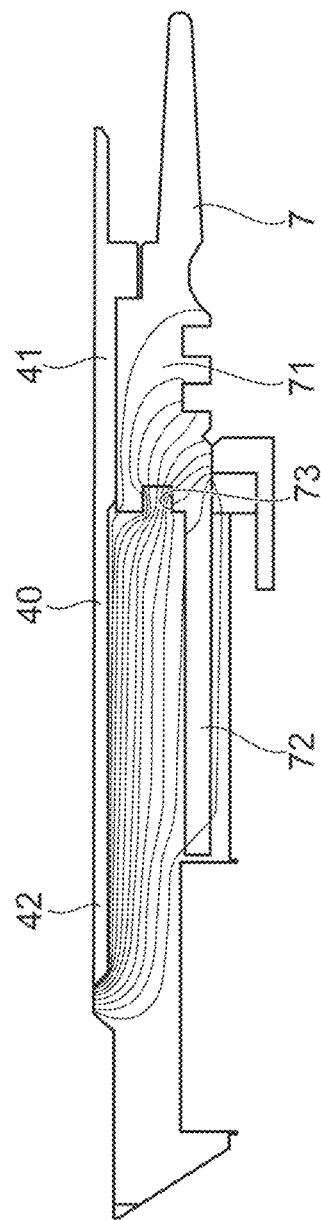
FIG. 7A is a diagram illustrating an example of an electric field distribution generated in the configuration of FIG. 6A.
Figure 7B:
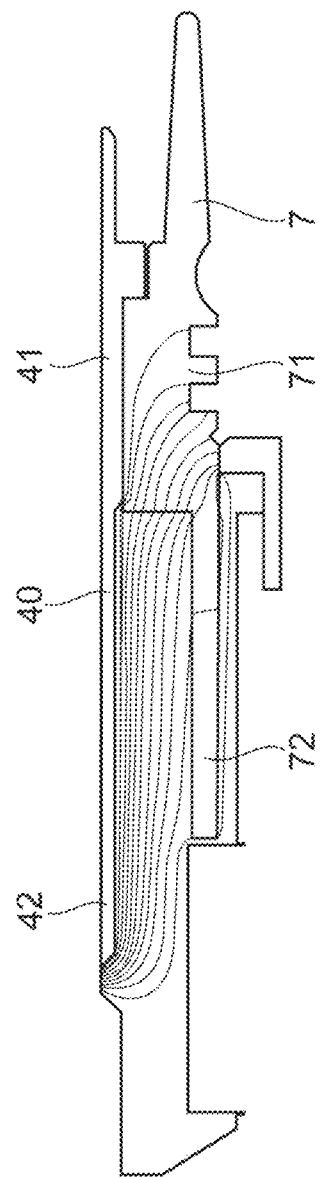
FIG. 7B is a diagram illustrating an example of an electric field distribution generated in the configuration of FIG. 6B.

This point will be described further with reference to FIGS. 6A to 7B. In FIGS. 7A and 7B, an electric field distribution generated in the configurations of FIGS. 6A and 6B is illustrated by equipotential lines. Among the equipotential lines, the equipotential lines which are closer to the first electrode 40 have lower potentials. In FIGS. 7A and 7B, only the lower side of the drawing is illustrated, but the same electric field distribution is also generated at the upper side. These are also the same for FIGS. 8B and 9B to be described later.

In a first modified example illustrated in FIG. 6B, the depression 73 is not formed and the surface 71a of the main body portion 71 is flat. Electrons E are apt to be generated in the vicinity of the triple junction P in which the discharge gas G1, the first insulation member 7, and the first electrode 40 are in contact with each other. The electrons E hop and move on the surface of the first insulation member 7 due to the electric field generated as illustrated in FIG. 7B and positively charge the surface of the first insulation member 7. The electrons are attracted to this positive charge and secondary electron multiplication may be generated. As a result, the secondary electrons that have acceleratedly increased in amount collide with molecules of the discharge gas G1 on the surface of the first insulation member 7 and release the molecules, so that a creeping discharge may be generated.

In contrast, as illustrated in FIG. 6A, in the light emitting sealed body 2, the depression 73 is formed in the surface 71a of the main body portion 71 of the first insulation member 7. Accordingly, the electrons E generated in the triple junction P can be captured by the depression 73. As a result, it is possible to suppress that the electrons E move along the surface 71a and reach the cylindrical portion 72 and to suppress the generation of the above-described unexpected discharge. In the light emitting sealed body 2, an electric field is generated as illustrated in FIG. 7A.

Further, in the light emitting sealed body 2, the depression 73 is disposed so as to be separated from each of the first electrode 40 and the cylindrical portion 72. Accordingly, it is possible to effectively suppress the generation of the unexpected discharge.

Modified Examples

In a second modified example illustrated in FIG. 8A, the depression 73 is disposed so as to contact the first electrode 40 and to be separated from the cylindrical portion 72. Also in the second modified example, similarly to the above-described embodiment, high efficiency and high output can be achieved and the quality of the output light can be increased. Further, the electrons E generated in the triple junction P can be captured by the depression 73 and the generation of the unexpected discharge can be effectively suppressed. In the second modified example, an electric field is generated as illustrated in FIG. 8B.

In a third modified example illustrated in FIG. 9A, the first insulation member 7 includes a covering portion 75 which surrounds a part of the base end side of the first electrode 40 in the X-axis direction. An inner peripheral surface 75b of the covering portion 75 surrounds a part of the front end side of the first support portion 41 and a part of the base end side of the first discharge portion 42. A gap 75s which extends to the tapered portion 42s of the base end side of the first discharge portion 42 is formed between the inner peripheral surface 75b and the outer peripheral surface of the first electrode 40. The covering portion 75 has a shape in which a thickness becomes thinner as it goes toward the second electrode 50 and an outer peripheral surface 75a of the covering portion 75 becomes a tapered surface. The outer peripheral surface 75a of the covering portion 75 is roughened. In the third modified example, the outer peripheral surface 75a is roughened by forming a plurality of grooves 76 extending around the first electrode 40 in the outer peripheral surface 75a. The plurality of grooves 76 are arranged side by side in the X-axis direction. Each groove 76 extends in a circular ring shape so as to surround the first electrode 40. The shape of the groove 76 in a cross-section parallel to the X-axis direction is, for example, a semi-circular shape.

Also in the third modified example, similarly to the above-described embodiment, high efficiency and high output can be achieved and the quality of the output light can be increased. Further, electrons generated in the triple junction P are difficult to reach the outer peripheral surface 75a of the covering portion 75 due to the gap 75s and the movement of electrons along the outer peripheral surface 75a can be suppressed by the plurality of grooves 76, so that the generation of the unexpected discharge can be suppressed. That is, in the third modified example, an electric field is generated as illustrated in FIG. 9B. Electrons easily move in the direction in which the equipotential lines are arranged (perpendicular to the electric field) and are difficult to move along the equipotential lines. Therefore, in the third modified example, electrons generated in the triple junction P are not easy to move along the outer peripheral surface 75a of the covering portion 75.

Figure 10:
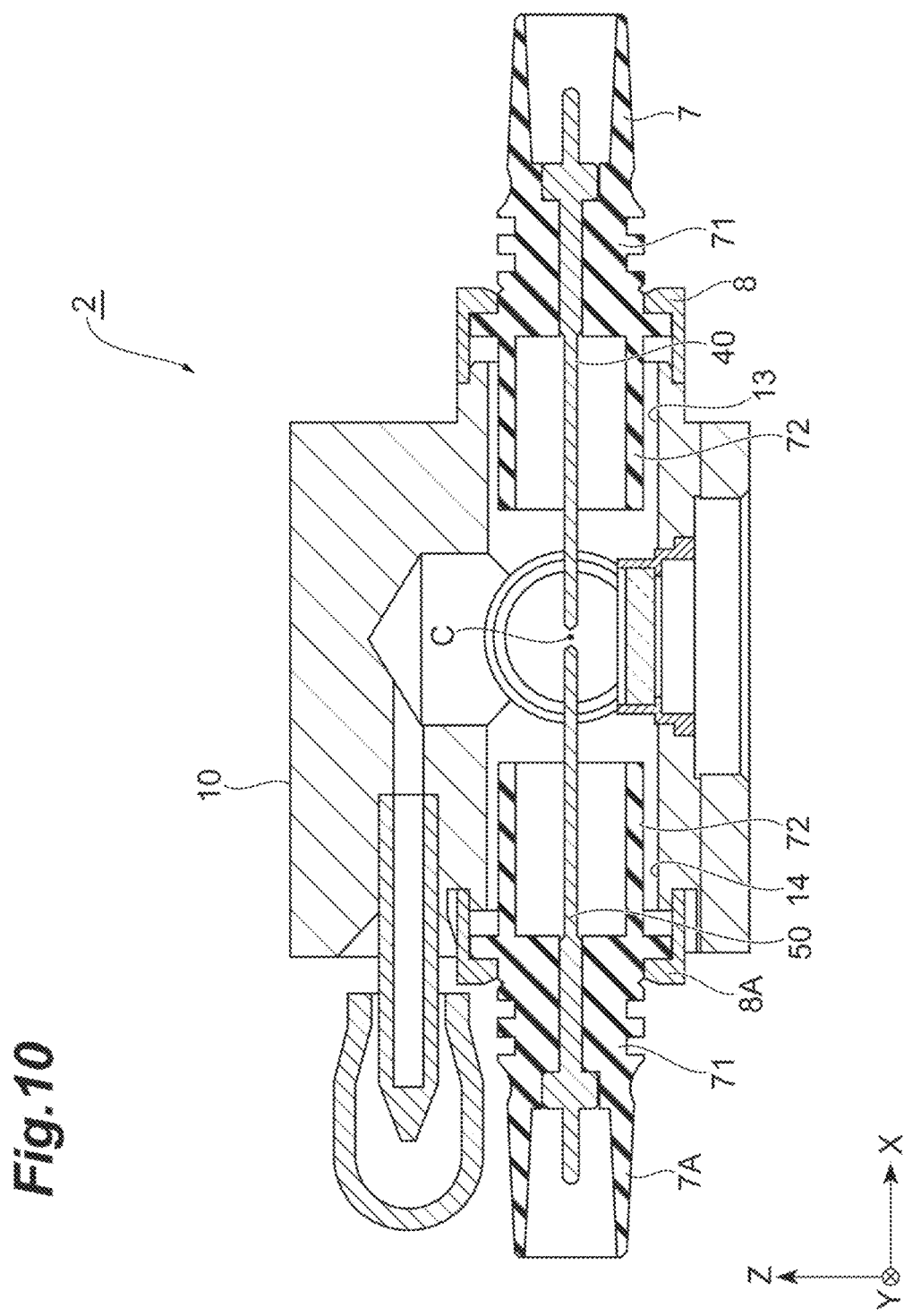
FIG. 10 is a cross-sectional view of a fourth modified example.

In a fourth modified example illustrated in FIG. 10, the second electrode 50 is fixed to the housing 10 via a second insulation member 7A and is electrically separated from the housing 10. The second insulation member 7A is hermetically fixed to the housing 10 through a connection member 8A. The second insulation member 7A is configured and connected similarly to the first insulation member 7 and the connection member 8A is configured and connected similarly to the connection member 8.

Also in the fourth modified example, similarly to the above-described embodiment, high efficiency and high output can be achieved and the quality of the output light can be increased. Further, since the second electrode 50 is electrically separated from the housing 10, a voltage can be individually applied to the first electrode 40 and the second electrode 50. For example, a positive voltage pulse may be applied to the second electrode 50 in accordance with a timing at which a negative voltage pulse is applied to the first electrode 40. In this case, it is possible to reduce an absolute value of a peak voltage of each of the negative voltage pulse applied to the first electrode 40 and the positive voltage pulse applied to the second electrode 50 compared to a case in which the negative voltage pulse is applied only to the first electrode 40. As a result, for example, noise caused when generating the negative voltage pulse and the positive voltage pulse can be reduced.

Figure 11:
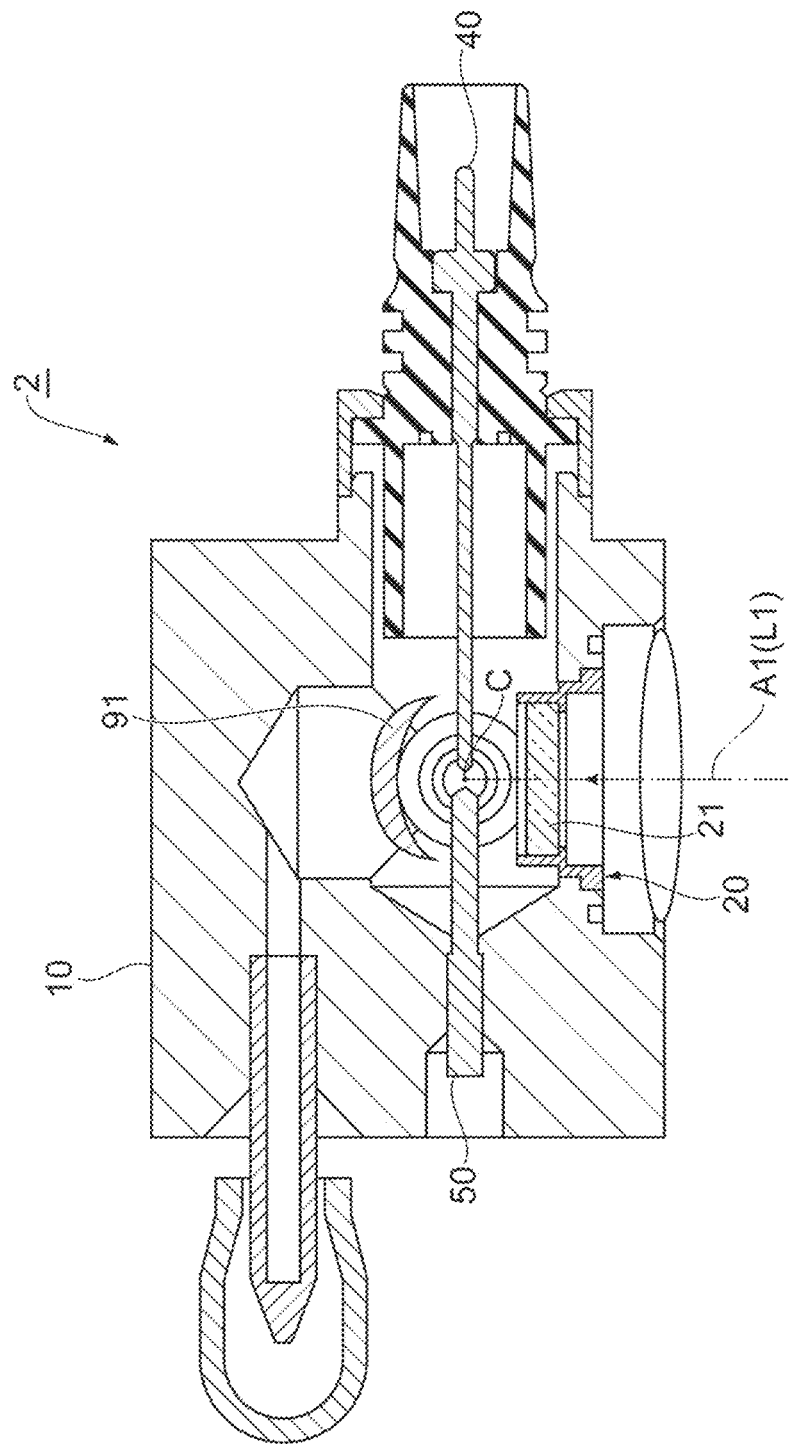
FIG. 11 is a cross-sectional view of a fifth modified example.

In a fifth modified example illustrated in FIG. 11, a mirror 91 is disposed inside the housing 10. The minor 91 faces the first window member 21 with the intersection C between the first optical axis A1 and the second optical axis A2 interposed therebetween. In the fifth modified example, the first light L1 passing through plasma in the first light L1 irradiated on the plasma from the first window member 21 is returned to the plasma while being condensed by the mirror 91. Also in the fifth modified example, similarly to the above-described embodiment, high efficiency and high output can be achieved and the quality of the output light can be increased. Further, since the first light L1 passing through the plasma can be returned to the plasma by the mirror 91, higher efficiency and higher output can be achieved.

Figure 12:
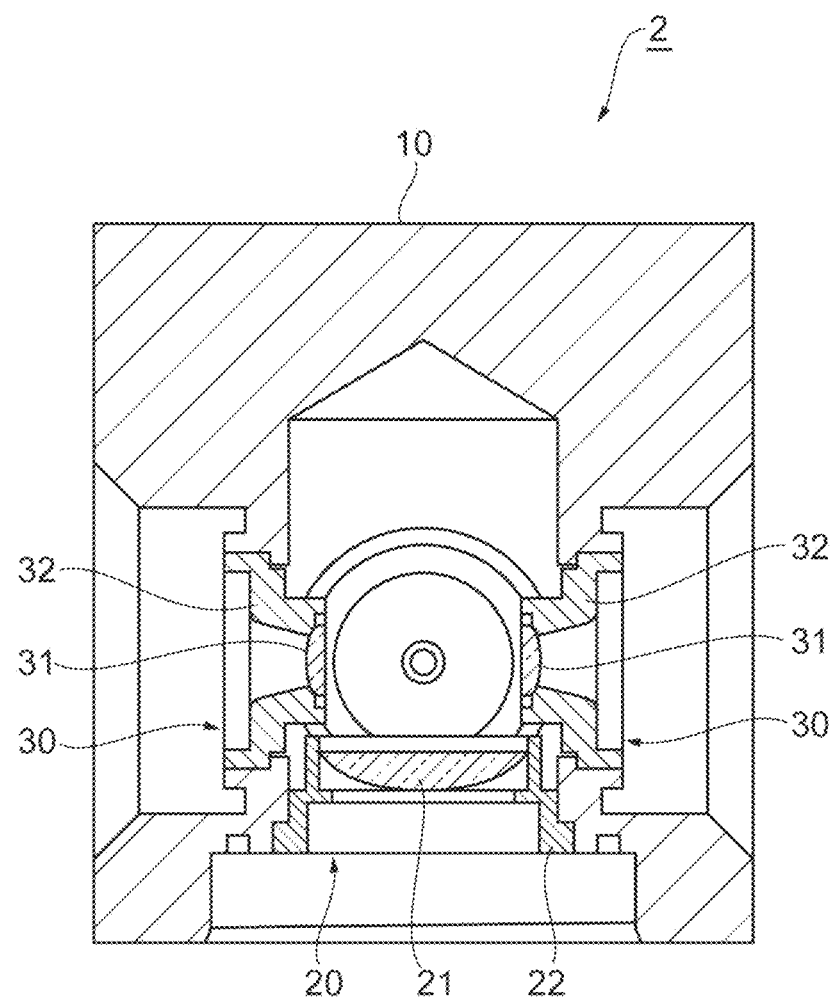
FIG. 12 is a cross-sectional view of a sixth modified example.

In a sixth modified example illustrated in FIG. 12, each of the first window member 21 and the second window member 31 has a lens shape. Also in the sixth modified example, similarly to the above-described embodiment, high efficiency and high output can be achieved and the quality of the output light can be increased. Further, the first window member 21 and the second window member 31 can have a lens effect and a beam diameter can be decreased.

Figure 13:
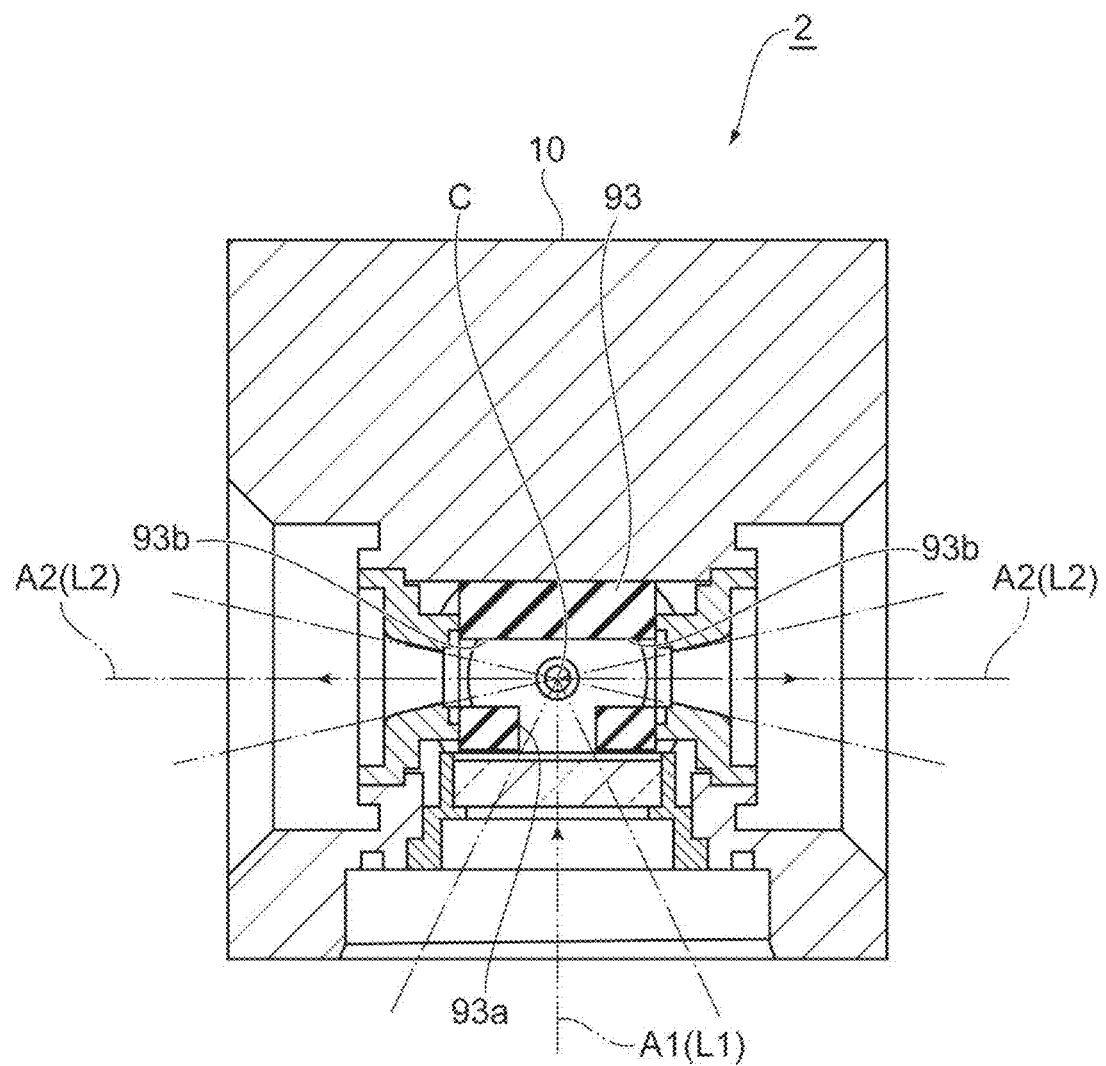
FIG. 13 is a cross-sectional view of a seventh modified example.

In a seventh modified example illustrated in FIG. 13, an insulation member (a space limiting member) 93 is disposed inside the housing 10. The insulation member 93 is formed in, for example, a block shape by an insulating material such as ceramic. The insulation member 93 is disposed so as to fill a region other than the optical paths of the first light L1 and the second light L2 in the internal space S3. As illustrated in FIG. 13, the first light L1 is directed toward the intersection C while being condensed and the second light L2 is directed from the intersection C toward the outside while being widened. The insulation member 93 includes a first opening 93a to which the first light L1 is incident and two second openings 93b from which the second light L2 is emitted. Also in the seventh modified example, similarly to the above-described embodiment, high efficiency and high output can be achieved and the quality of the output light can be increased. Further, the generation of the leakage current inside the housing 10 can be suppressed. Further, since the internal space S3 is filled by the insulation member 93, it is possible to suppress convection due to the discharge gas G1 in the internal space S3. As a result, it is possible to suppress a situation in which the light emitting point shakes due to convection.

The present disclosure is not limited to the above-described embodiment and the modified example. For example, the material and shape of each component are not limited to the materials and shapes described above and various materials and shapes can be adopted. The shapes of the first opening 11 and the second opening 12 are not limited to the circular shape and may be various shapes. The shapes of the first window member 21 and the second window member 31 are not limited to the circular plate shape and may be various shapes. The roughness of the surface 71a of the main body portion 71 and/or the outer peripheral surface 75a of the covering portion 75 is not limited to the case of forming the depression or the groove and may be performed by forming a protrusion or forming an unevenness portion. In the present disclosure, "A and/or B" means "at least one of A and B".

The joining material 23 may be a silver brazing material not doped with titanium or may be a titanium brazing material or a nickel brazing material. This is also the same in the joining materials 18, 33, 43, 53, and 83. In the above-described embodiment, two second openings 12 are formed, but only one second opening 12 may be formed and three or more second openings 12 may be formed. A material forming the housing 10 may be a light shielding material which does not transmit (interrupts) the first light L1 and the second light L2 and may not be necessarily a metal material. An insulating material, for example, ceramic or the like may be used. The first electrode 40 and the second electrode 50 may be omitted. Also in this case, plasma can be generated at a focal point by irradiating the discharge gas G1 with the condensed first light L1.

The first window member 21 may be formed of diamond and the second window is member 31 may be formed of sapphire. Alternatively, both the first window member 21 and the second window member 31 may be formed of sapphire or diamond. When using UV light, the first window member 21 and/or the second window member 31 may be formed of magnesium fluoride or quartz. The first window member 21 and/or the second window member 31 may be formed of Kovar glass.

The laser light source 3 may not be provided inside the laser excitation light source 1. For example, the laser excitation light source 1 may include an optical fiber which guides light from a light source disposed at the outside to the minor 4 instead of the laser light source 3. In this case, the light introduction unit R which cause the first light L1 to be incident to the first opening 11 along the first optical axis A1 is configured by the optical fiber, the mirror 4, and the optical system 5.

What is claimed is:
1. A light emitting sealed body comprising:
   a housing which stores a discharge gas and is provided with a first opening to which first light is incident along a first optical axis and a second opening from which second light is emitted along a second optical axis, wherein the first light is laser light for maintaining plasma generated in the discharge gas and the second light is light from the plasma;
   a first window portion that hermetically seals the first opening and transmits the first light, the first window portion including a first light incident surface and a first light emitting surface; and
   a second window portion which hermetically seals the second opening and transmits the second light, the second window portion including a second light incident surface and a second light emitting surface,
   wherein the housing is formed of a light shielding material which does not transmit the first light and the second light, wherein an internal space is defined by the housing, the first window portion, and the second window portion and the entire internal space is filled with the discharge gas, wherein the first opening and the second opening are disposed so that the first optical axis and the second optical axis intersect each other, and wherein each of the first light incident surface, the first light emitting surface, the second light incident surface, and the second light emitting surface is located closer to an intersection between the first optical axis and the second optical axis than an outer surface of the housing.

2. The light emitting sealed body according to claim 1, further comprising a space limiting member filling a region other than optical paths of the first light and the second light in the internal space.

3. The light emitting sealed body according to claim 2, wherein the space limiting member is formed of an insulating material.

4. The light emitting sealed body according to claim 2, wherein the space limiting member includes a wall portion that faces the first window portion and intersects with the first optical axis.

5. The light emitting sealed body according to claim 2, wherein the first window portion further includes a first frame member fixed to the housing and the second window portion further includes a second frame member fixed to the housing, and wherein the space limiting member is positioned in the internal space by the first frame member and the second frame member.

6. The light emitting sealed body according to claim 2, wherein the housing is formed of a metal material.

7. The light emitting sealed body according to claim 6, further comprising a first electrode and a second electrode which face each other with an intersection between the first optical axis and the second optical axis interposed therebetween.

8. The light emitting sealed body according to claim 7, wherein the first electrode is fixed to the housing via an insulation member and the second electrode is fixed and electrically connected to the housing.

9. The light emitting sealed body according to claim 8, wherein a diameter of the second electrode is larger than a diameter of the first electrode.

10. The light emitting sealed body according to claim 7, further comprising an enclosing tube that is connected to the internal space and fixed to the housing to extend in a direction along which at least one of the first electrode and the second electrode extends.

11. The light emitting sealed body according to claim 10, wherein a protection member is attached to a sealed end of the enclosing tube.

* * * * *